(12) United States Patent
Mogi et al.

(10) Patent No.: US 11,092,366 B2
(45) Date of Patent: Aug. 17, 2021

(54) EXPANSION VALVE (71) Applicant: Fujikoki Corporation, Tokyo (JP)

(72) Inventors: Takashi Mogi, Tokyo (JP); Kouhei Kubota, Tokyo (JP); Ryo Matsuda, Tokyo (JP); Shin Honda, Kariya (JP); Kurato Yamasaki, Kariya (JP); Shigeki Ito, Kariya (JP)

(73) Assignee: FUJIKOKI CORPORATION, Tokyo (JP)

( * ) Notice: Subject to any disclaimer, the term of this patent is extended or adjusted under 35 U.S.C. 154(b) by 103 days.

(21) Appl. No.: 16/622,405

(22) PCT Filed: May 22, 2018

(86) PCT No.: PCT/JP2018/019607
§ 371 (c)(1),
(2) Date: Dec. 13, 2019

(87) PCT Pub. No.: WO2019/012810
PCT Pub. Date: Jan. 17, 2019

(65) Prior Publication Data
US 2020/0200278 A1  Jun. 25, 2020

(30) Foreign Application Priority Data

Jul. 12, 2017 (JP) .............................. JP2017-136293

(51) Int. Cl.
*F25B 41/31* (2021.01)
*F16K 1/42* (2006.01)
*F16K 1/46* (2006.01)

(52) U.S. Cl.
CPC ............... *F25B 41/31* (2021.01); *F16K 1/42* (2013.01); *F16K 1/46* (2013.01); *F25B 2500/13* (2013.01)

(58) Field of Classification Search
CPC .................... F16K 1/2057; F25B 41/31; F25B 2341/0683; F25B 2341/06; F25B 2500/13
See application file for complete search history.

(56) References Cited

U.S. PATENT DOCUMENTS

2005/0252238 A1* 11/2005 Kobayashi .............. F25B 41/31
                                                             62/527
2013/0283836 A1* 10/2013 Satake .................... F25B 41/31
                                                             62/225

(Continued)

FOREIGN PATENT DOCUMENTS

JP      H08-145505 B2   6/1996
JP      2008014628 A    1/2008

(Continued)

OTHER PUBLICATIONS

International Search Report dated Aug. 7, 2018 for PCT/JP2018/019607 and English translation.

(Continued)

Primary Examiner — Kelsey E Cary
(74) Attorney, Agent, or Firm — Lucas & Mercanti, LLP (57) ABSTRACT It is an object of the present invention to provide an expansion valve with an improved ring spring.
Accordingly, in the present invention, the expansion valve includes a valve body including a valve chamber, a valve element disposed in the valve chamber, a biasing member configured to bias the valve element toward a valve seat, an actuation rod that presses the valve element in a valve opening direction against a biasing force of the biasing member, and a ring spring disposed between an outer circumferential surface of the actuation rod and an inner circumferential surface of the valve body. The ring spring includes a ring portion, at least three elastic protrusion portions that protrude inward from the ring portion and contact the outer circumferential surface of the actuation (Continued)

rod, and at least one outward protrusion portion that protrudes outward from the ring portion and contacting the inner circumferential surface of the valve body.

8 Claims, 7 Drawing Sheets

(56) References Cited

U.S. PATENT DOCUMENTS

| | | |
|---|---|---|
| 2014/0261765 A1 | 9/2014 | Satake |
| 2016/0097574 A1* | 4/2016 | Kaneko ............... F16K 27/02 62/225 |
| 2019/0170411 A1 | 6/2019 | Kamata et al. |

FOREIGN PATENT DOCUMENTS

| | | |
|---|---|---|
| JP | 2009192198 A | 8/2009 |
| JP | 2014149128 A | 8/2014 |
| JP | 2014173807 A | 9/2014 |
| JP | 6053543 B2 | 12/2016 |
| JP | 2018025332 A | 2/2018 |

OTHER PUBLICATIONS

Written Opinion of ISA dated Aug. 7, 2018 for PCT/JP2018/019607 (Japanese only).

* cited by examiner

EXPANSION VALVE

CROSS REFERENCE TO RELATED APPLICATION

This Application is a 371 of PCT/JP2018/019607 filed on May 22, 2018 which, in turn, claimed the priority of Japanese Patent Application No. 2017-136293 filed on Jul. 12, 2017, both applications are incorporated herein by reference.

TECHNICAL FIELD

The present invention relates to an expansion valve, and more particularly, to an expansion valve having a vibration isolation ring spring.

BACKGROUND OF THE INVENTION

There is known a phenomenon in which, in expansion valves, a pressure differential between the pressure on the upstream side of a valve element and the pressure on the downstream side of the valve element causes the valve element and an actuation rod for pressing the valve element to vibrate, thereby generating a harsh noise. In order to suppress this vibration, a vibration isolation ring spring may be disposed in the valve body of the expansion valve.

As an example of a related technique, Patent Document 1 discloses a thermal expansion valve. The thermal expansion valve described in Patent Document 1 includes a vibration isolation member fitted to the outer circumferential surface of the actuation rod to prevent vibration of the actuation rod. The vibration isolation member has an annular portion in which an elongated plate-shaped elastic material is elastically deformed into an annular shape, and three vibration isolation springs which are formed by cutting parts of the elastic material and bending them inward. Each vibration isolation spring is disposed at a position that divides the circumference into three equal portions, and the spring force of one of the vibration isolation springs is set to be larger than the others, such that the actuation rod is pressed against the inner wall of the through hole into which the actuation rod is inserted to generate frictional resistance, thereby efficiently obtaining the vibration suppression effect.

CITATION LIST

Patent Literature

[Patent Document 1] Japanese Patent No. 6053543

SUMMARY OF INVENTION

Technical Problem

In the thermal expansion valve described in Patent Document 1, the spring force of one of the three vibration isolation springs is set to be larger than the spring force of the other vibration isolation springs. Accordingly, the pressing forces of the vibration isolation springs against the actuation rod are not uniform. As a result, if the thermal expansion valve is used for a long period of time, wear may occur at a specific position of the actuation rod and/or at a sliding contact portion of a specific vibration isolation spring (in other words, uneven wear may occur), and the vibration isolation performance of the vibration isolation member may deteriorate. In addition, since there is a difference between the spring force of one of the three vibration isolation springs and the spring force of the other vibration isolation springs, the design of the vibration isolation members may become complicated.

Accordingly, it is an object of the present invention to provide an expansion valve with an improved ring spring.

Solution to Problem

In order to achieve the above purpose, an expansion valve according to the present invention includes a valve body including a valve chamber, a valve element disposed in the valve chamber, a biasing member configured to bias the valve element toward a valve seat, an actuation rod that comes into contact with the valve element and presses the valve element in a valve opening direction against a biasing force of the biasing member, and a ring spring disposed between an outer circumferential surface of the actuation rod and an inner circumferential surface of the valve body. The ring spring includes a ring portion, at least three elastic protrusion portions that protrude inward from the ring portion and contact the outer circumferential surface of the actuation rod, and at least one outward protrusion portion that protrudes outward from the ring portion and contacting the inner circumferential surface of the valve body.

In the expansion valve, elasticity moduli of the at least three elastic protrusion portions may all be equal.

In the expansion valve, the ring spring may be formed of a plate member. The outward protrusion portion may be a plastic deformation portion formed by plastically deforming a portion of the plate member.

In the expansion valve, the plastic deformation portion may have a partially spherical shell shape.

In the expansion valve, the outward protrusion portion may be a plate-shaped protrusion portion that protrudes outward from the ring portion.

In the expansion valve, an entirety of the plate-shaped protrusion portion may be disposed further outward than the ring portion.

In the expansion valve, one of the at least three elastic protrusion portions may be directly connected to the outward protrusion portion.

Advantageous Effects of Invention

Accordingly, the present invention can provide an expansion valve with an improved ring spring.

DESCRIPTION OF EMBODIMENT(S)

Hereinafter, the expansion valve 1 according to embodiments will be described with reference to the drawings. It should be noted that, in the following description of the embodiments, components and members having the same functions are denoted by the same reference numerals, and redundant descriptions of components and members denoted by the same reference numerals are omitted.
(Definition of Directions)

In this specification, the direction extending from the valve element 3 toward the actuation rod 5 is defined as the "upward direction," and the direction extending from the actuation rod 5 toward the valve element 3 is defined as the "downward direction." Accordingly, in this specification, the direction extending from the valve element 3 toward the actuation rod 5 is referred to as the "upward direction" regardless of the orientation of the expansion valve 1.
(Overview of the Expansion Valve)

Figure 1:
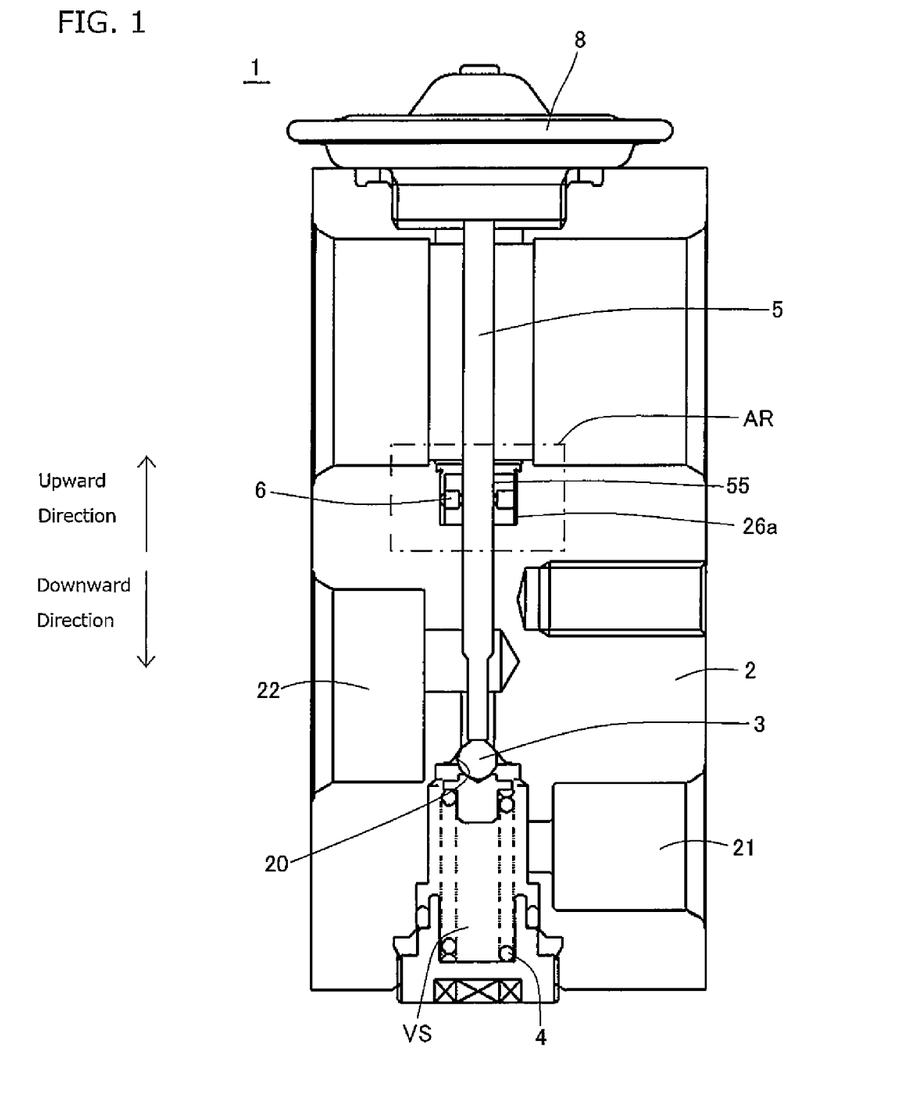
FIG. 1 is a diagram schematically illustrating the overall structure of an expansion valve according to embodiments.
Figure 2:
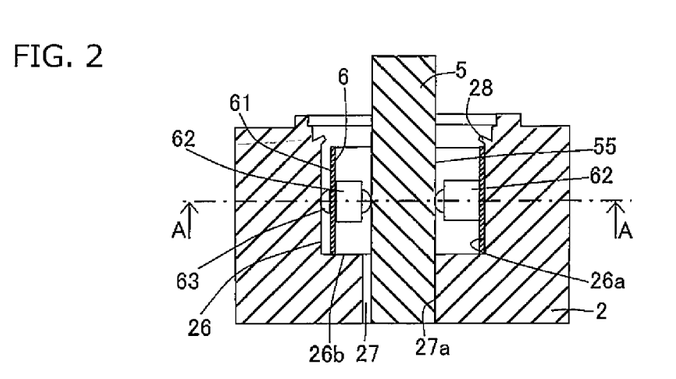
FIG. 2 is an enlarged view of an area AR around the ring spring.
Figure 3:
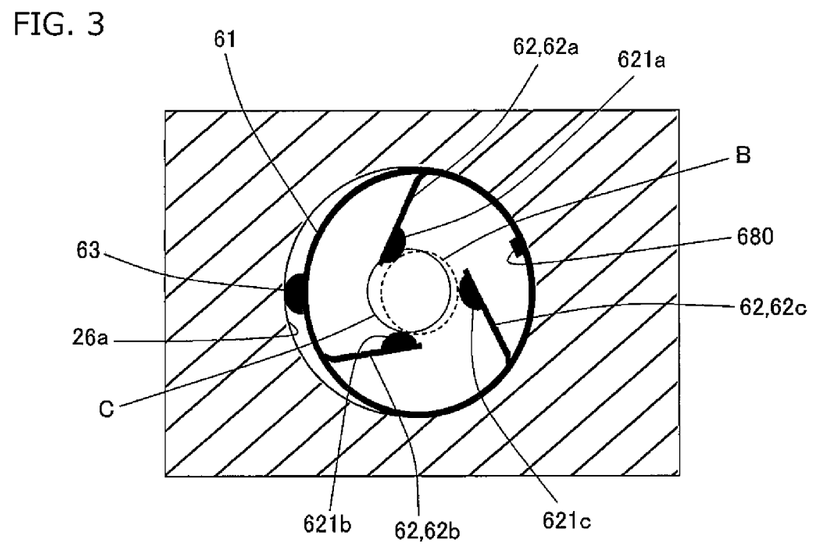
FIG. 3 is a cross-sectional view taken along the line A-A of FIG. 2.
Figure 4:
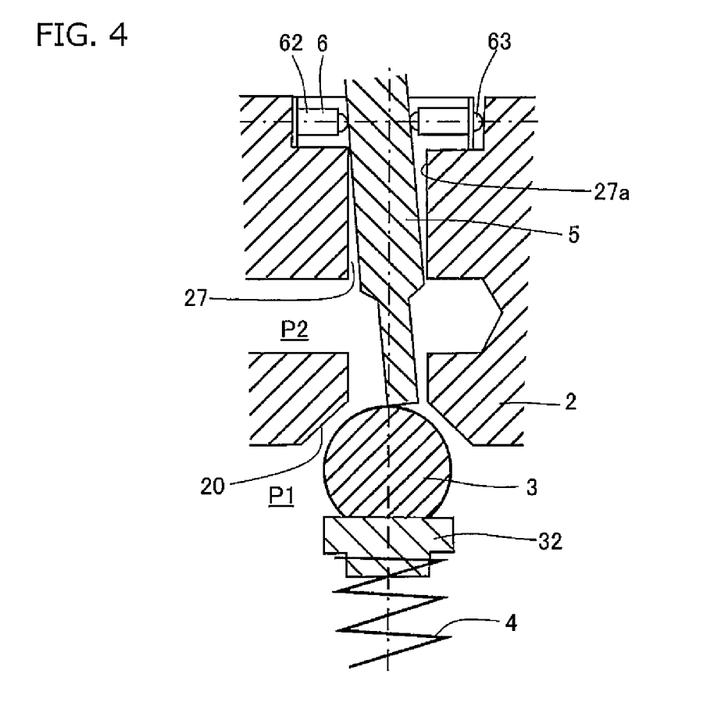
FIG. 4 is a conceptual diagram schematically illustrating the position of the actuation rod and the valve element during the operation of the expansion valve, in embodiments.

An overview of the expansion valve 1 according to the embodiments will be described with reference to FIG. 1 to FIG. 4. FIG. 1 is a diagram schematically illustrating the overall structure of the expansion valve 1 according to the embodiment. It should be noted that in FIG. 1, a portion corresponding to the power element 8 is illustrated in a side view, and the other portions are illustrated in a cross-sectional view. FIG. 2 is an enlarged view of an area AR around the ring spring 6. FIG. 3 is a cross-sectional view taken along the line A-A of FIG. 2. FIG. 4 is a conceptual diagram schematically illustrating the position of the actuation rod 5 and the valve element 3 during the operation of the expansion valve 1, in embodiments.

The expansion valve 1 includes a valve body 2 having a valve chamber VS, a valve element 3, a biasing member 4, an actuation rod 5, and a ring spring 6.

In addition to the valve chamber VS, the valve body 2 includes a first flow path 21 and a second flow path 22. The first flow path 21 is, for example, a supply-side flow path, and a fluid is supplied to the valve chamber VS via the supply-side flow path. The second flow path 22 is, for example, a discharge side flow path, and the fluid in the valve chamber VS is discharged to the outside of the expansion valve via the discharge side flow path.

The valve element 3 is disposed in the valve chamber VS. When the valve element 3 is seated on the valve seat 20 of the valve body 2, the first flow path 21 and the second flow path 22 are in a non-communicative state. In contrast, when the valve element 3 is separated from the valve seat 20, the first flow path 21 and the second flow path 22 are in a communicative state.

The biasing member 4 biases the valve element 3 toward the valve seat 20. The biasing member 4 is, for example, a coil spring.

The lower end of the actuation rod 5 is in contact with the valve element 3. The actuation rod 5 presses the valve element 3 in the valve opening direction against the biasing force of the biasing member 4. When the actuation rod 5 moves downward, the valve element 3 is separated from the valve seat 20, and the expansion valve 1 enters an open state.

The ring spring 6 is a vibration isolation member for suppressing vibration of the actuation rod 5. The ring spring 6 is arranged between the outer circumferential surface 55 of the actuation rod 5 and the inner circumferential surface 26a of the valve body 2.

In the example illustrated in FIG. 2, the valve body 2 includes a concave portion 26 in which the ring spring 6 is disposed, and an actuation rod insertion hole 27 through which the actuation rod 5 is inserted. The upper portion of the concave portion 26 is open, and the lower portion of the concave portion 26 communicates with the actuation rod insertion hole 27.

In the example according to FIG. 2, it is possible to arrange the ring spring 6 in the concave portion 26 from above the concave portion 26. The ring spring 6 is positioned in the concave portion 26 by caulking the caulking portion 28 of the valve body 2. It should be noted that the lower end of the ring spring 6 is preferably disposed in contact with the bottom surface 26b of the concave portion 26.

In the example illustrated in FIG. 2, the center axis of the inner circumferential surface 26a of the valve body 2 (more specifically, the concave portion 26), coincides with the center axis of the actuation rod insertion hole 27.

As illustrated in FIG. 2 and FIG. 3, the ring spring 6 includes a ring portion 61, at least three elastic protrusion portions 62, and an outward protrusion portion 63. The ring portion 61 is an annular portion that surrounds the circumference of the actuation rod 5. The elastic protrusion portions 62 protrude inward from the ring portion 61 (that is, on the side on which the actuation rod 5 is disposed), and contact the outer circumferential surface 55 of the actuation rod 5. In the example illustrated in FIG. 3, the number of the elastic protrusion portions 62 is three, but the number of the elastic protrusion portions 62 may be four or more.

The outward protrusion portion 63 protrudes outward from the ring portion 61 (that is, on the side where the actuation rod 5 is not disposed), and contacts the inner circumferential surface 26a of the valve body 2. In the example illustrated in FIG. 2 and FIG. 3, the number of outward protrusion portions 63 is one.

In embodiments, the ring spring 6 includes the outward protrusion portion 63, and this outward protrusion portion 63 is in contact with the inner circumferential surface 26a of the valve body 2. Accordingly, the center of the imaginary circle B passing through the tip portions of the plurality of elastic protrusion portions 62 (in the example illustrated in FIG. 3, in a state in which no load acts on the elastic protrusion portions 62, the imaginary circle passing through the tip portion 621a of the first elastic protrusion portion 62a, the tip portion 621b of the second elastic protrusion portion 62b, and the tip portion 621c of the third elastic protrusion portion 62c) is eccentric from the center of the inner circumferential surface 26a of the valve body 2. It should be noted that, in FIG. 3, the circle C indicates a circle in a state in which the center of the imaginary circle B is not eccentric from the inner circumferential surface 26a.

In embodiments, the imaginary circle B passing through the tip portions of the plurality of elastic protrusion portions 62 is eccentric from the center of the inner circumferential surface 26a of the valve body 2. Accordingly, the position of the actuation rod 5 in contact with the tip portions of the plurality of elastic protrusion portions 62 is also eccentric from the center of the inner circumferential surface 26a of the valve body 2. As a result, as illustrated in FIG. 2, a part of the actuation rod 5 contacts the inner wall surface 27a (the inner wall surface of the valve body 2) that defines the actuation rod insertion hole 27.

In embodiments, since a part of the actuation rod 5 contacts the inner wall surface 27a, the vibration of the actuation rod 5 in the lateral direction (that is, in the direction perpendicular to the longitudinal direction of the actuation rod 5) is suppressed. In other words, the ring spring 6 applies a lateral restraining force to the actuation rod 5 by pressing the actuation rod 5 against the inner wall surface 27a. In addition, in embodiments, since a part of the actuation rod 5 contacts the inner wall surface 27a, the vibration of the actuation rod 5 in the longitudinal direction (that is, in a direction along the longitudinal direction of the actuation rod 5), is also suppressed. In other words, the ring spring 6 applies a longitudinal sliding resistance to the actuation rod 5 by pressing the actuation rod 5 against the inner wall surface 27a.

As described above, the ring spring 6 applies a lateral restraining force and a longitudinal sliding resistance to the actuation rod 5. Thus, in the expansion valve 1 according to embodiments, the vibration of the actuation rod 5 is effectively suppressed.

It should be noted that in the example illustrated in FIG. 2, the central axis of the actuation rod 5 and the central axis of the actuation rod insertion hole 27 are parallel to each other. Alternatively, as illustrated in FIG. 4, the central axis of the actuation rod 5 and the central axis of the actuation rod insertion hole 27 may be non-parallel. In this case as well, the ring spring 6 presses a part of the actuation rod 5 against the inner wall surface 27a, and applies a lateral restraining force and a longitudinal sliding resistance to the actuation rod 5.

When the valve opening degree is small, in other words, when the separation distance between the valve element 3 and the valve seat 20 is small as illustrated in FIG. 4, the pressure differential between the pressure P1 on the upstream side of the valve element 3 and the pressure P2 on the downstream side of the valve element 3 is large. This pressure differential causes the valve element 3 to vibrate laterally. However, in embodiments, since a lateral restraining force is applied to the actuation rod 5, this lateral restraining force is also applied to the valve element 3 contacting the actuation rod 5. As a result, the lateral vibration of the valve element 3 is suppressed. In addition, in embodiments, since a sliding resistance in the longitudinal direction (the vertical direction) is applied to the actuation rod 5, it is difficult for the valve element 3 in contact with the actuation rod 5 to move in the longitudinal direction as well. That is, in embodiments, the vibration of the valve element 3 in the longitudinal direction is also suppressed.

It should be noted that, in embodiments, it is preferable that the elasticity moduli of the at least three elastic protrusion portions 62 are all equal. For example, in the example illustrated in FIG. 3, it is preferable that the elasticity modulus of the first elastic protrusion portion 62a and the elasticity modulus of the second elastic protrusion portion 62b are equal to each other, and that the elasticity modulus of the second elastic protrusion portion 62b and the elasticity modulus of the third elastic protrusion portion 62c are equal to each other.

When the elasticity moduli of the at least three elastic protrusion portions 62 are all equal, the at least three elastic protrusion portions 62 apply elastic force to the actuation rod 5 in a balanced manner. Accordingly, wear does not occur due to the deviation of a specific elastic protrusion portion. In this way, the deterioration of the vibration isolation performance of the ring spring 6 is suppressed.

Furthermore, when the elasticity moduli of the at least three elastic protrusion portions 62 are all equal, the design of the ring spring 6 does not become complicated. In cases where the elasticity modulus of a certain elastic protrusion portion and the elasticity modulus of another elastic protrusion portion are different from each other, it is necessary to adjust the degree of difference of the elasticity moduli to suppress the generation of harsh noises. In contrast, when all the elasticity moduli of the three or more elastic protrusion portions 62 are equal, the elasticity moduli of all the elastic protrusion portions may be uniformly adjusted, so that the operation of adjusting the elasticity moduli becomes easy to perform.

In embodiments, it is preferable that the at least three elastic protrusion portions 62 are arranged at equal intervals along the circumferential direction of the ring portion 61. In the case that the at least three elastic protrusion portions 62 are arranged at equal intervals along the circumferential direction of the ring portion 61, the magnitude of the restoring force when the center of the actuation rod 5 deviates from the center of the imaginary circle B is substantially constant, regardless of the deviation direction. In this way, stable vibration isolation performance can be obtained.

(First Example of Ring Spring)

Figure 5A:
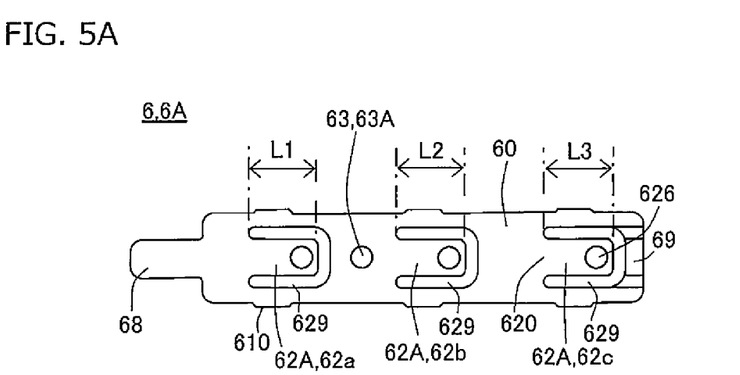
FIG. 5A is a schematic development view schematically illustrating the ring spring of a first example.
Figure 5B:
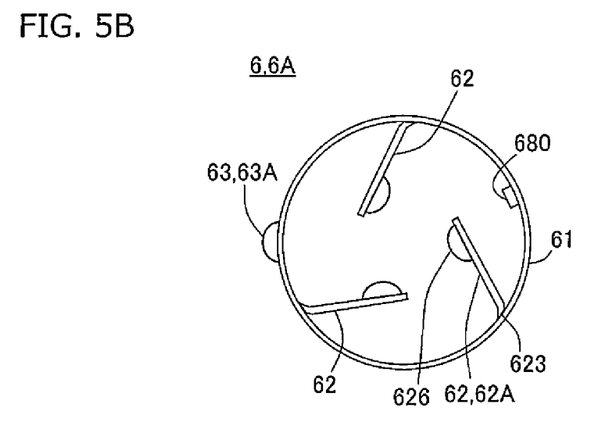
FIG. 5B is a schematic plan view schematically illustrating the ring spring of the first example.

Referring to FIG. 5A and FIG. 5B, a first embodiment of the ring spring 6 that can be utilized in the expansion valve 1 according to embodiments will be described. FIG. 5A is a schematic development view schematically illustrating the ring spring 6A of the first example. FIG. 5B is a schematic plan view schematically illustrating the ring spring 6A of the first example.

In the first example, the ring spring 6A is formed of a plate member 60. The plate member 60 is, for example, a plate member formed of metal, such as stainless steel.

In the first example, the outward protrusion portion 63 is a plastic deformation portion 63A formed by plastically deforming a portion of the plate member 60.

In the case that the ring spring 6A is formed of the plate member 60, the ring portion 61 can be formed by bending the plate member 60 into a ring shape. In the example illustrated in FIG. 5A, the plate member 60 (ring spring 6A) includes an end tongue piece 68 at a first longitudinal end and a tongue piece receiving portion 69 for receiving the end tongue piece 68 at a second longitudinal end. The tongue piece receiving portion 69 and the end tongue piece 68 are overlapped to form the ring portion 61. It should be noted that it is preferable for the overlapping portion 680 formed by the overlapping of the tongue piece receiving portion 69 and the end tongue piece 68 not to have a portion protruding toward the outer circumferential surface side, and for the outer circumferential surface to be smooth. In contrast, the overlapping portion 680 may have a portion protruding toward the inner circumferential surface side. The overlapping portion 680 constitutes a part of the ring portion 61.

It should be noted that, in FIG. 5A, the convex portion 610 protruding in the widthwise direction of the plate member is a portion used when the plate member 60 is curve processed into a ring shape or the like.

In the example illustrated in FIG. 5A, the outward protrusion portion 63 is a plastic deformation portion 63A formed by press working the plate member 60 perpendicular to the plate surface. In the examples illustrated in FIG. 5A and FIG. 5B, the plastic deformation portion 63A has a partially spherical shell shape. It should be noted that the partial spherical shell shape refers to a shape that coincides with or substantially coincides with a part of a spherical shell. In the case that the plastic deformation portion 63A has a partially spherical shell shape, since the portion in contact with the inner circumferential surface 26a of the valve body 2 becomes a smooth curved surface portion, the inner circumferential surface 26a of the valve body 2 is unlikely to be damaged. In addition, since the partial spherical shell shape is a shape having high structural strength, the shape of the plastic deformation portion 63A (the outward protrusion portion 63) is unlikely to collapse over a long period of time.

In the first example, the ring spring 6A is formed of a plate member 60. Accordingly, the manufacturing costs of the ring spring 6A are reduced. In addition, in the first example, the outward protrusion portion 63 is a plastic deformation portion 63A formed by plastically deforming a portion of the plate member 60. The plastic deformation of the plate member 60 is relatively easily performed, and the manufacturing cost is low. Accordingly, in the first example, it is easy to manufacture the outward protrusion portion 63, and the manufacturing costs of the ring spring 6A having the outward protrusion portion 63 are reduced.

In the example illustrated in FIG. 5A, the outward protrusion portion 63 is formed by press working. Accordingly, it is possible to easily change the position at which the outward protrusion portion 63 is provided by changing the position at which the press work is performed. In addition, by changing the diameter or the like of the punch to be pressed, the size of the outward protrusion portion 63 (for example, the protrusion length or the like), can be easily changed. That is, in the first example, there is a high degree of freedom in selecting the position and the size of the outward protrusion portion 63. Accordingly, the position and size of the outward protrusion portion 63 may be changed in accordance with the state of generation of harsh noise from the expansion valve 1 or the like.

In the example illustrated in FIG. 5A, each of the elastic protrusion portions 62 that protrudes inward toward the ring portion 61 is a tongue piece 62A provided on the plate member 60. The tongue piece 62A is formed, for example, by cutting out the plate member 60 into a U-shape. In other words, in the example illustrated in FIG. 5A, the plate member 60 includes U-shaped cut-out portions 629 and tongue pieces 62A disposed inside the cut-out portions 629. In the example illustrated in FIG. 5A, the outward protrusion portion 63 is provided between two adjacent tongue pieces 62A (in other words, between two adjacent cut-out portions 629).

The proximal end portions 620 of the tongue pieces 62A are respectively deformed by bending in advance (by a bending process), and then the plate member 60 is curved into an annular shape, so that each of the tongue pieces 62A protrudes inside the ring portion 61. This bending process is performed in a direction opposite to the direction in which the outward protrusion portion 63 projects, that is, a bending process in the upward direction of the drawing of FIG. 5A. Subsequently, the plate member 60 is curve processed such that the tongue piece receiving portion 69 and the end tongue piece 68 are overlapped with each other. In this way, the ring portion 61 is formed, and each of the tongue pieces 62A protrudes inside of the ring portion 61. It should be noted that the above-mentioned bending process may be performed after the above-mentioned curve process. Reference numeral 623 in FIG. 5B denotes a bent portion formed between one of the tongue pieces 62A and the ring portion 61 by the above described bending process.

In the examples illustrated in FIG. 5A and FIG. 5B, it is preferable that the elasticity modulus of the first elastic protrusion portion 62a and the elasticity modulus of the second elastic protrusion portion 62b are equal to each other, and that the elasticity modulus of the second elastic protrusion portion 62b and the elasticity modulus of the third elastic protrusion portion 62c are equal to each other. In the examples described in FIG. 5A and FIG. 5B, the shape of the first elastic protrusion portion 62a, the shape of the second elastic protrusion portion 62b, and the shape of the third elastic protrusion portion 62c are all equal. More specifically, the length L1 of the first elastic protrusion portion 62a, the length L2 of the second elastic protrusion portion 62b, and the length L3 of the third elastic protrusion portion 62c are all equal. In addition, the width of the first elastic protrusion portion 62a, the width of the second elastic protrusion portion 62b, and the width of the third elastic protrusion portion 62c are all equal. Further, the thickness of the first elastic protrusion portion 62a, the thickness of the second elastic protrusion portion 62b, and the thickness of the third elastic protrusion portion 62c are all equal.

It should be noted that, in the examples illustrated in FIG. 5A and FIG. 5B, each of the elastic protrusion portions 62 has a tip protrusion portion 626 protruding toward the actuation rod 5 at tip portion thereof. The tip protrusion portions 626 are formed by, for example, plastic deformation (more specifically, press working). The shape of the tip protrusion portions 626 is, for example, a partially spherical shell shape. In the case where the tip protrusion portions 626 have a partially spherical shell shape, since the portion contacting the outer circumferential surface 55 of the actuation rod 5 becomes a smoothly curved surface portion, the outer circumferential surface 55 of the actuation rod 5 is unlikely to be damaged. In addition, since the partially spherical shell shape is a shape having high structural strength, the shape of the tip protrusion portion 626 is unlikely to collapse over a long period of time.

(Second Example of the Ring Spring)

Figure 6A:
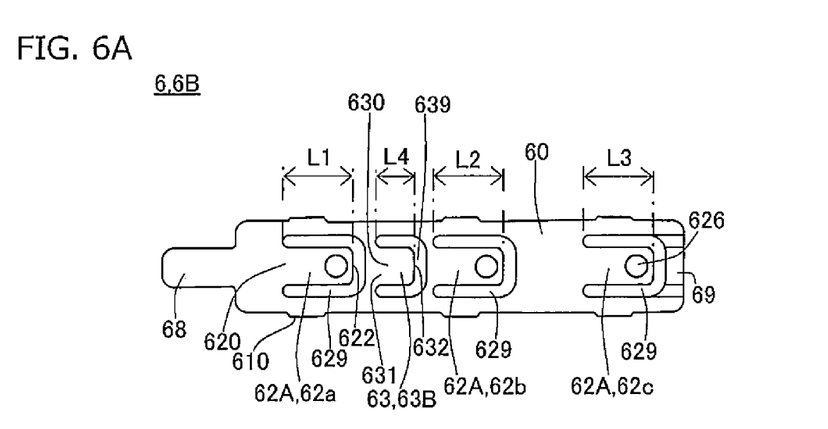
FIG. 6A is a schematic development view schematically illustrating the ring spring of a second example.
Figure 6B:
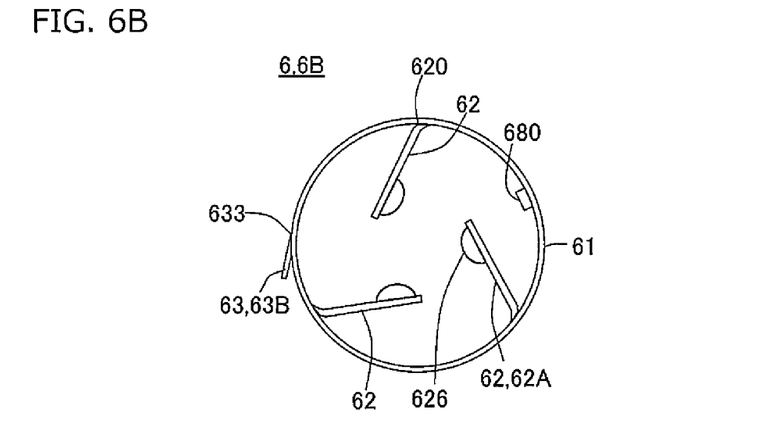
FIG. 6B is a schematic plan view schematically illustrating the ring spring of the second example.

Referring to FIG. 6A and FIG. 6B, a second example of the ring spring 6 that can be utilized in the expansion valve 1 according to embodiments will be described. FIG. 6A is a schematic development view schematically illustrating the ring spring 6B of the second example. FIG. 6B is a schematic plan view schematically illustrating the ring spring 6B of the second example.

The ring spring 6B in the second example differs from the ring spring 6A in the first example in that the outward protrusion portion 63 is a plate-shaped protrusion portion 63B that protrudes outward from the ring portion 61. Accordingly, in the second example, the outward protrusion portion 63 will be primarily described, and redundant description of other configurations will be omitted. In the second example, the entire plate-shaped protrusion portion 63B is disposed outside the ring portion 61.

In the second example, the ring spring 6B is formed of a plate member 60. The outward protrusion portion 63 is formed by a portion of the plate member 60.

More specifically, in the example illustrated in FIG. 6A, the outward protrusion portion 63 (the plate-shaped protrusion portion 63B) is a tongue piece 630 provided on the plate member 60. The tongue piece 630 is formed, for example, by cutting out the plate member 60 into a U-shape. In other words, in the example illustrated in FIG. 6A, the plate member 60 includes a U-shaped cut-out portion 639 and a tongue piece 630 disposed inside the cut-out portion 639. In the example illustrated in FIG. 6A, the outward protrusion portion 63 (the tongue piece 630) is provided between two adjacent tongue pieces 62A (in other words, between two adjacent cut-out portions 629).

It should be noted that, in FIG. 6A (the development view of the ring spring 6B), the direction extending from the proximal end portion 631 to the tip portion 632 of the plate-shaped protrusion portion 63B is the same as the direction extending from the proximal end portion 620 to the tip portion 622 of the first elastic protrusion portion 62a. Alternatively, the direction extending from the proximal end portion 631 to the tip portion 632 of the plate-shaped protrusion portion 63B may be opposite to the direction extending from the proximal end portion 620 to the tip portion 622 of the first elastic protrusion portion 62a.

In the examples illustrated in FIG. 6A and FIG. 6B, the length L4 of the tongue piece 630 is shorter than the length (L1, L2, L3) of the tongue pieces 62A. In the examples described in FIG. 6A and FIG. 6B, by changing the length L4 of the tongue piece 630, the amount of the tongue piece 630 that protrudes from the ring portion 61 can be changed; in other words, the amount of eccentricity of the imaginary circle B can be changed.

In addition, in the examples described in FIG. 6A and FIG. 6B, the proximal end portion 631 of the tongue piece 630 may be deformed by bending to cause the tongue piece 630 to project outward from the ring portion 61. In other words, as illustrated in FIG. 6B, a bent portion 633 (a plastic deformation portion) may be disposed between the tongue piece 630 and the ring portion 61. In this case, the entire tongue piece 630 (the plate-shaped protrusion portion 63B) protrudes outside of the ring portion 61. Alternatively, the bent portion 633 may be positioned at a position other than the proximal end portion 631 of the tongue piece 630, so that only a portion of the tongue piece 630 (the plate-shaped protrusion portion 63B) protrudes outside of the ring portion 61.

In the examples illustrated in FIG. 6A and FIG. 6B, the outward protrusion portions 63 (tongue pieces 630) can be formed by cutting out the plate member 60. Thus, the manufacturing cost of the outward protrusion portion 63 is reduced. It should be noted that the cutting-out may be performed by laser machining, or may be performed by a punching process using a cutting blade and a pedestal.

(Third Example of the Ring Spring)

Figure 7A:
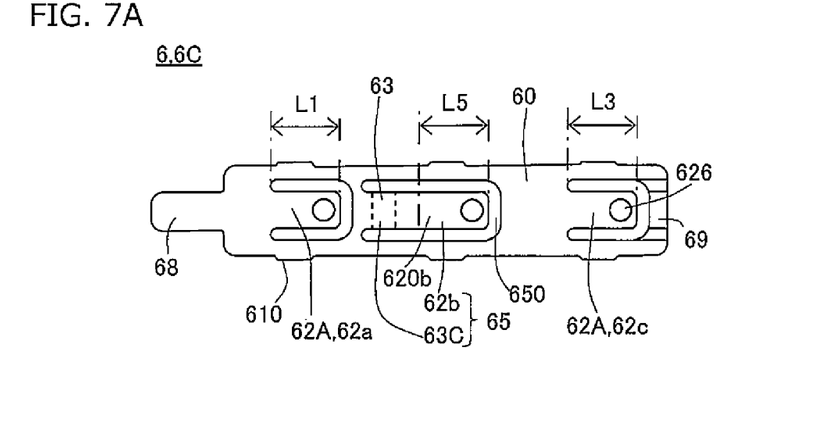
FIG. 7A is a schematic development view schematically illustrating the ring spring of a third example.
Figure 7B:
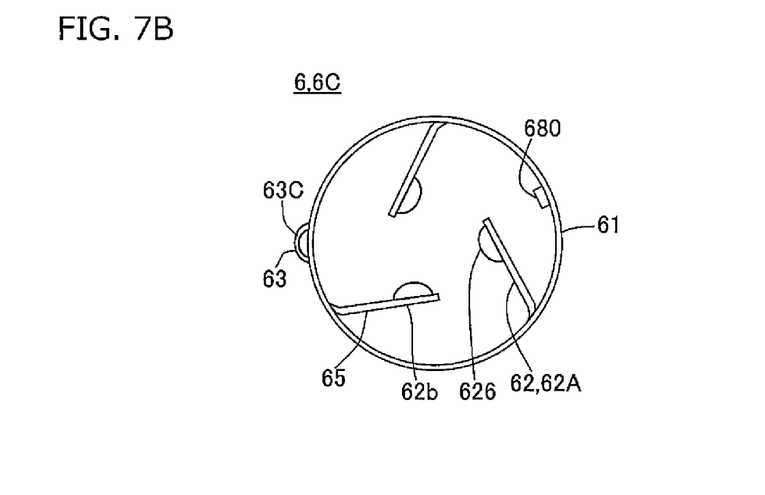
FIG. 7B is a schematic plan view schematically illustrating the ring spring of the third example.

Referring to FIG. 7A and FIG. 7B, a third example of the ring spring 6 that can be utilized in the expansion valve 1 according to embodiments will be described. FIG. 7A is a schematic development view schematically illustrating the ring spring 6C of the third example. FIG. 7B is a schematic plan view schematically illustrated the ring spring 6C of the third example.

The ring spring 6C in the third example differs from the ring spring 6A in the first example and the ring spring 6B in the second example in that the proximal end portion 620b of the at least three elastic protrusion portions 62 is in direct communication with the outward protrusion portion 63. Accordingly, in the third example, the outward protrusion portion 63 and the elastic protrusion portions directly connected to the outward protrusion portion (more specifically, the second elastic protrusion portion 62b) will be primarily described, and redundant descriptions of other configurations will be omitted.

In the third example, the ring spring 6C is formed of a plate member 60. In addition, the outward protrusion portion 63 is formed by a portion of the plate member 60.

In the example illustrated in FIG. 7A, the outward protrusion portion 63 is a portion of the tongue piece 65 provided on the plate member 60. The tongue piece 65 is formed, for example, by cutting out the plate member 60 into a U-shape. In other words, in the example illustrated in FIG. 7A, the plate member 60 includes a U-shaped cut-out portion 650 and a tongue piece 65 disposed inside the cut-out portion 650.

In addition, in the examples illustrated in FIG. 7A and FIG. 7B, the first portion 63C (the base side portion) of the tongue piece 65 is the outward protrusion portion 63 that protrudes outward from the ring portion 61, and the second portion (tip side portion) of the tongue piece 65 is the second elastic protrusion portion 62b that protrudes inward from the ring portion 61.

In the example illustrated in FIG. 7B, the first portion 63C of the tongue piece 65 is plastically deformed by bend processing. That is, the first portion 63C is a plastic deformation portion. In the example illustrated in FIG. 7B, the first portion 63C (the plastic deformation portion) has a semicircular shape in a plan view, but the shape of the first portion 63C is not limited to a semicircular shape.

In the examples illustrated in FIG. 7A and FIG. 7B, the length L5 of the second portion of the tongue piece 65, that is, the second elastic protrusion portion 62b, is equal to the length L1 of the first elastic protrusion portion 62a, and is equal to the length L3 of the third elastic protrusion portion 62c.

In the examples illustrated in FIG. 7A and FIG. 7B, the outward protrusion portion 63 (the first portion 63C) can be formed by cutting out the plate member 60 and performing bend processing on the tongue piece 65 formed by the cutting-out. Thus, the manufacturing cost of the outward protrusion portion 63 is reduced. It should be noted that the cutting-out may be performed by laser machining, or may be performed by a punching process using a cutting blade and a pedestal.

In addition, in the example illustrated in FIG. 7A, one tongue piece 65 includes an outward protrusion portion 63 that protrudes outside of the ring portion 61 and a second elastic protrusion portion 62b that protrudes inside of the ring portion 61. Accordingly, in the example illustrated in FIG. 7A, the number of tongue pieces can be reduced in comparison with the example illustrated in FIG. 6A.

In the above-described first to third examples, the ring spring 6 is provided with the outward protrusion portion 63, and the above-mentioned imaginary circle B becomes eccentric due to the presence of the outward protrusion portion 63. Accordingly, the ring spring 6 can apply a lateral restraining force and a longitudinal sliding resistance to the actuation rod 5. As a result, in the expansion valve 1 provided with the ring spring 6, the vibration of the actuation rod 5 is effectively suppressed.

In the first to third examples, it is preferable that the elasticity moduli of the at least three elastic protrusion portions 62 of the ring spring 6 are all equal. In this case, the at least three elastic protrusion portions 62 apply elastic force to the actuation rod 5 in a balanced manner. Accordingly, wear does not occur due to the deviation of a specific elastic protrusion portion. In this way, the deterioration of the vibration isolating performance of the ring spring 6 is suppressed. Furthermore, when the elasticity moduli of the at least three elastic protrusion portions 62 are all equal, the design of the ring spring 6 does not become complicated.

Further, in the first to third examples, it is preferable that the lengths of the at least three elastic protrusion portions 62 of the ring spring 6 are all equal. In this case, it becomes easier to design the ring spring to exhibit desirable anti-vibration characteristics. In particular, when the shapes of the at least three elastic protrusion portions 62 of the ring spring 6 are all the same, the design becomes the simplest.

(Application Example of Expansion Valve 1)

Figure 8:
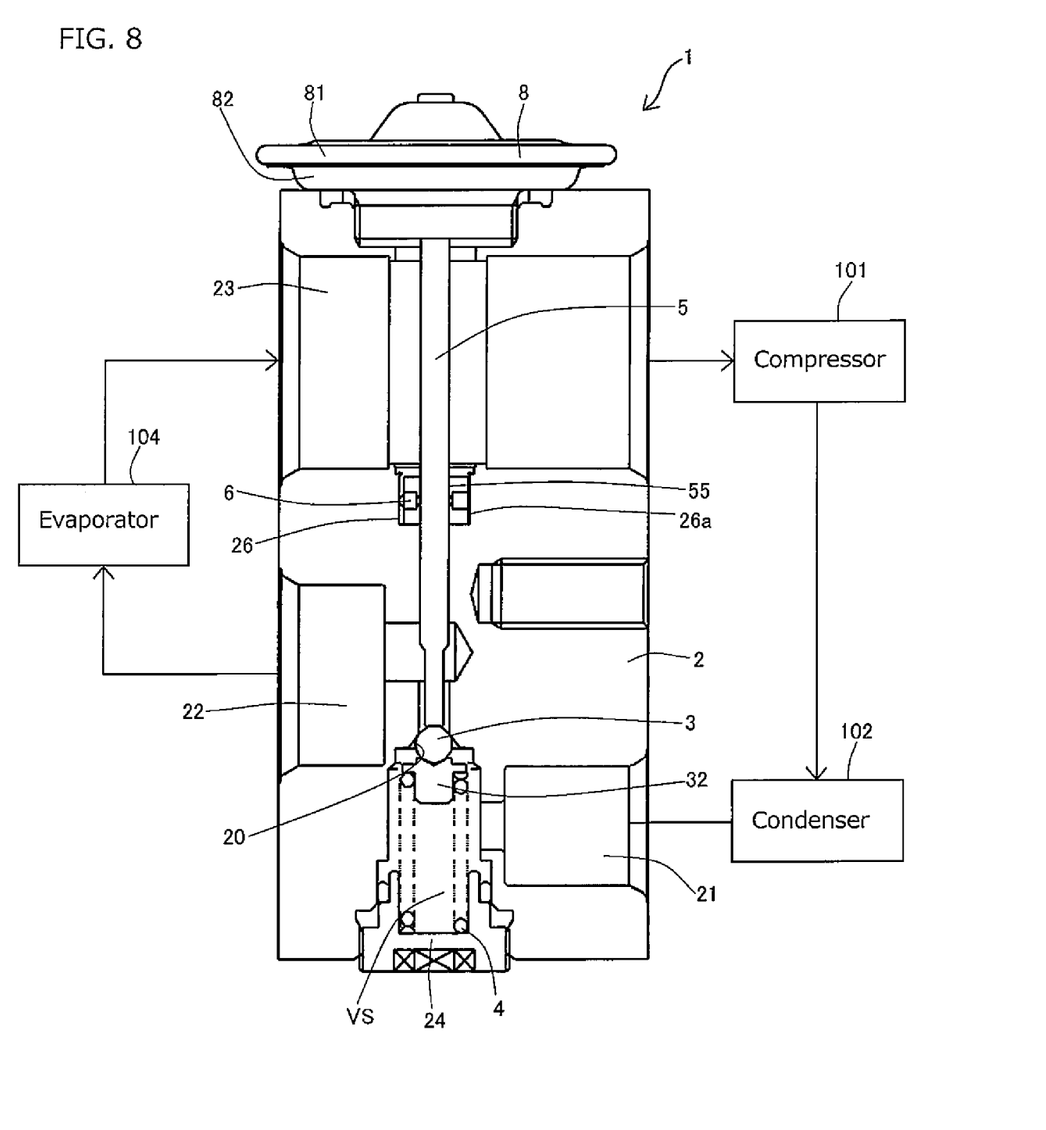
FIG. 8 is a schematic cross-sectional view of the expansion valve according to embodiments, illustrating an example applied to a refrigerant circulation system.

An application example of the expansion valve 1 will be described with reference to FIG. 8. FIG. 8 is a schematic cross-sectional view of the expansion valve 1 according to embodiments, illustrating an example applied to a refrigerant circulation system 100.

In the example illustrated in FIG. 8, the expansion valve 1 is fluidly connected to a compressor 101, a condenser 102, and an evaporator 104.

In addition to the valve body 2, the valve element 3, the biasing member 4, the actuation rod 5, the ring spring 6, the first flow path 21, and the second flow path 22, the expansion valve 1 includes a power element 8 and a return flow path 23.

Referring to FIG. 8, refrigerant pressurized by the compressor 101 is liquefied by the condenser 102 and sent to the expansion valve 1. The refrigerant adiabatically expanded by the expansion valve 1 is sent to the evaporator 104, and heat exchange is performed by the evaporator 104 with the air flowing around the evaporator. The refrigerant returning from the evaporator 104 is returned to the compressor 101 side through the expansion valve 1 (more specifically, the return flow path 23).

The high-pressure refrigerant is supplied from the condenser 102 to the expansion valve 1. More specifically, the high-pressure refrigerant from the condenser 102 is supplied to the valve chamber VS via the first flow path 21. In the valve chamber VS, the valve element 3 is disposed so as to face the valve seat 20. The valve element 3 is supported by a valve element support 32, and the valve element support 32 is biased upward by a biasing member 4 (for example, a coil spring). In other words, the valve element 3 is biased in the valve closing direction by the biasing member 4. The biasing member 4 is disposed between the valve element support 32 and the biasing member receiving member 24. In the example illustrated in FIG. 8, the biasing member receiving member 24 is a plug which is mounted on the valve body 2 to seal the valve chamber VS.

When the valve element 3 is seated on the valve seat 20 (that is, when the expansion valve 1 is in the closed state), the first flow path 21 on the upstream side of the valve chamber VS and the second flow path 22 on the downstream side of the valve chamber VS are in a non-communicative state. On the other hand, when the valve element 3 is separated from the valve seat 20 (in other words, when the expansion valve 1 is in the open state), the refrigerant supplied to the valve chamber VS is delivered to the evaporator 104 through the second flow path 22. It should be noted that the switching between the closed state and the open state of the expansion valve 1 is performed by the actuation rod 5 connected to the power element 8.

In the example illustrated in FIG. 8, the power element 8 is arranged at the upper end of the expansion valve 1. The power element 8 includes a top cover member 81, a receiving member 82 having an opening at a center thereof, and a diaphragm disposed between the top cover member 81 and the receiving member 82. The first space surrounded by the top cover member 81 and the diaphragm is filled with a working gas.

The lower surface of the diaphragm is connected to the actuation rod via a diaphragm support member. Therefore, when the working gas in the first space is liquefied, the actuation rod 5 moves upward, and when the liquefied working gas is vaporized, the actuation rod 5 moves downward. In this manner, the expansion valve 1 is switched between the open state and the closed state.

The second space between the diaphragm and the receiving member 82 communicates with the return flow path 23. Accordingly, the phase of the working gas in the first space (gas phase, liquid phase, etc.) changes in accordance with the temperature and pressure of the refrigerant flowing through the return flow path 23, and the actuation rod 5 is driven. In other words, in the expansion valve 1 illustrated in FIG. 8, the amount of the refrigerant supplied from the expansion valve 1 to the evaporator 104 is automatically adjusted in accordance with the temperature and pressure of the refrigerant returned from the evaporator 104 to the expansion valve 1. In the example illustrated in FIG. 8, the return flow path 23 communicates with the concave portion 26, and the concave portion 26 is disposed below the return flow path 23.

It should be noted that the present invention is not limited to the above-described embodiments. Variations of any of the components of the embodiments described above are possible within the scope of the present invention. In addition, any component can be added or omitted in the above-described embodiments.

For example, in the embodiments described above, an example has been described in which the ring spring 6 includes one outward protrusion portion 63. Alternatively, two or more outward protrusion portions 63 may be non-equally spaced along the circumference of the ring portion 61.

In addition, in the embodiments described above, an example in which the ring spring 6 is made of metal has been described. Alternatively, the ring spring 6 may be made of resin.

Further, in the above-described embodiments (the third example of the ring spring), an example in which the elastic protrusion portion directly connected to the outward protrusion portion 63 is the second elastic protrusion portion 62b has been described. Alternatively, the elastic protrusion portion directly connected with the outward protrusion portion 63 may be an elastic protrusion portion other than the second elastic protrusion portion 62b.

REFERENCE SIGNS LIST

1: Expansion valve
2: Valve body
3: Valve element
4: Biasing member
5: Actuation rod
6, 6A, 6B, 6C: Ring spring
8: Power element
20: Valve seat
21: First flow path
22: Second flow path
23 Return flow path
24: Biasing member receiving member
26: Concave portion
26a: Inner circumferential surface
26b: Bottom surface
27: Actuation rod insertion hole
27a: Inner wall surface
28: Caulking portion
32: Valve element support
55: Outer circumferential surface
60: Plate member
61: Ring portion
62: Elastic protrusion portion
62A: Tongue piece
62a: First elastic protrusion portion 62*b*: Second elastic protrusion portion
62*c*: Third elastic protrusion portion
63: Outward protrusion portion
63A: Plastic deformation portion
63B: Plate-shaped protrusion portion
63C: First portion
65: Tongue piece
68 End tongue piece
69: Tongue piece receiving portion
81: Top cover member
82: Receiving member
100: Refrigerant circulation system
101 Compressor
102: Condenser
104: Evaporator
610: Convex portion
620: Proximal end portion
620*b*: Proximal end portion
621*a*: Tip portion
621*b*: Tip portion
621*c*: Tip portion
622: Tip portion
623: Bent portion
626: Tip protrusion portion
629: Cut-out portion
630: Tongue piece
631: Proximal end portion
632: Tip portion
633: Bent portion
639: Cut-out portion
650: Cut-out portion
680: Overlapping portion
VS: Valve chamber

The invention claimed is:

1. An expansion valve comprising:
a valve body including a valve chamber;
a valve element disposed in the valve chamber;
a biasing member configured to bias the valve element toward a valve seat;
an actuation rod that comes into contact with the valve element and presses the valve element in a valve opening direction against a biasing force of the biasing member; and
a ring spring disposed between an outer circumferential surface of the actuation rod and an inner surface of the valve body;
wherein the ring spring includes:
a ring portion,
at least three elastic protrusion portions that protrude inward from the ring portion and contact the outer circumferential surface of the actuation rod, and
one or more outward protrusion portions arranged in a circumferential direction of the ring portion at irregular intervals, and protruding outward from the ring portion and contacting the inner circumferential surface of the valve body.

2. The expansion valve according to claim 1, wherein:
the one or more outward protrusion portions come in contact with the inner circumferential surface of the valve body, whereby the ring spring pushes the actuation rod onto an inner wall surface of the valve body.

3. The expansion valve according to claim 1, wherein:
elasticity moduli of the at least three elastic protrusion portions are all equal.

4. The expansion valve according to claim 1, wherein:
the ring spring is formed from a plate member; and
the outward protrusion portion is a plastic deformation portion formed by plastically deforming a portion of the plate member.

5. The expansion valve according to claim 4, wherein:
the plastic deformation portion has a partially spherical shell shape.

6. The expansion valve according to claim 1, wherein:
the outward protrusion portion is a plate-shaped protrusion portion that protrudes outward from the ring portion.

7. The expansion valve according to claim 6, wherein:
an entirety of the plate-shaped protrusion portion is disposed further outward than the ring portion.

8. The expansion valve according to claim 1, wherein:
one of the at least three elastic protrusion portions is directly connected to the outward protrusion portion.

* * * * *